United States Patent
Komatsu

[11] Patent Number: 5,986,735
[45] Date of Patent: Nov. 16, 1999

[54] IN-PLANE SWITCHING MODE LIQUID CRYSTAL DISPLAY WITH ALIGNMENT LAYERS OF DIFFERENT ANCHORING ENERGIES

[75] Inventor: Hiroshi Komatsu, Kumi, Rep. of Korea

[73] Assignee: LG Electronics Inc., Seoul, Rep. of Korea

[21] Appl. No.: 08/934,771

[22] Filed: Sep. 22, 1997

[30] Foreign Application Priority Data

Sep. 21, 1996 [KR] Rep. of Korea ................. 96-41513

[51] Int. Cl.⁶ .................. G02F 1/1337; G02F 1/1343
[52] U.S. Cl. ................................ 349/128; 349/141
[58] Field of Search ......................... 349/141, 128

[56] References Cited

U.S. PATENT DOCUMENTS

| | | | |
|---|---|---|---|
| 5,598,285 | 1/1997 | Kondo et al. | 349/39 |
| 5,784,137 | 7/1998 | Shiomi et al. | 349/88 |
| 5,793,459 | 8/1998 | Toko | 349/128 |

FOREIGN PATENT DOCUMENTS

| | | |
|---|---|---|
| 7-36058 | 2/1995 | Japan . |
| 7-225388 | 8/1995 | Japan . |

OTHER PUBLICATIONS

M. Ohta et al., "Development of Super–TFT–LCDs With In–Plane Switching Display Mode", Asia Display '95, pp. 707–710.

R. Kiefer et al., "In–Plane Switching of Nematic Liquid Crystals", Japan Display '92, pp. 547–550.

*Primary Examiner*—William L. Sikes
*Assistant Examiner*—Heidi L. Eisenhut
*Attorney, Agent, or Firm*—Morgan, Lewis & Bockius LLP

[57] ABSTRACT

An in-plane switching liquid crystal display device includes an inorganic alignment layer having low anchoring energy and an organic alignment layer having higher anchoring energy than that of the inorganic alignment layer. Applying the voltage between electrodes, only liquid crystal molecules in the vicinity of the inorganic alignment layer are affected by the electric field to be twisted about 90° in the liquid crystal layer.

21 Claims, 5 Drawing Sheets

IN-PLANE SWITCHING MODE LIQUID CRYSTAL DISPLAY WITH ALIGNMENT LAYERS OF DIFFERENT ANCHORING ENERGIES

This application claims the benefit of Korean patent application No. 1996-41513, filed Sep. 21, 1996, which is hereby incorporated by reference.

BACKGROUND OF THE INVENTION

1. Field of the Invention

The present invention relates to a liquid crystal display device, and more particularly, to an in-plane switching mode liquid crystal display device having high brightness.

2. Discussion of Related Art

A great need has arisen recently for thin film transistor liquid crystal display devices (TFT LCD) having wide-angle images, for use in such applications as portable televisions, notebook computers, etc. However, the TFT LCD's in use today have a problem in that their contrast ratio depends on the viewing-angle. In order to overcome this problem, a number of approaches have been proposed, including, for example, a twisted nematic LCD having a mounted optical compensator, and a multi-domain LCD, among others. However, it is not expected that the contrast ratio and color shifting dependence on the viewing angle will be adequately solved by such LCDs.

Another proposal discloses an in-plane switching liquid crystal display device. It is suggested that such a device will have a wider viewing angle, as disclosed, for example, in the JAPAN DISPLAY 92 P457, Japanese Patent Unexamined Publication No. 7-36058, Japanese Patent Unexamined Publication No. 7-225338, and ASIA DISPLAY 95 P707.

FIGS. 1 and 2A–2B show a conventional in-plane switching mode liquid crystal display device. As shown in these figures, the alignment directions of the substrates 10, 11 are approximately perpendicular to the gate bus line 1 formed on the first substrate 10 to align the liquid crystal molecules of the liquid crystal layer 19. A first polarizer 25 having a polarization axis parallel to the gate bus line 1 is attached to the substrate 10, and a second polarizer 26 having polarization axis direction parallel to the alignment direction of the alignment layers 21a, 21b is attached to the second substrate 11. Data (or pixel) electrodes 5 and common electrodes 6 are formed in the direction perpendicular to the gate bus lines 1 and the data bus lines 2. The common bus line 7 is parallel to the gate bus line 1. A thin film transistor, having a gate electrode 4 connected to the gate bus line 1 and whose source/drain electrodes 3 are connected to the data bus line 2 and the pixel electrode 5, is formed at the cross region of the gate bus line 1 and the data bus line 2. The liquid crystal display device also includes a shielding layer 8 such as black matrix on the second substrate 11, a color filter layer 17, and passivation layers 16a, 16b.

When no voltage is applied, the liquid crystal molecules are obliquely aligned in the direction of the data and common electrodes 5, 6 along the alignment direction. When voltage is applied, the liquid crystal molecules are rotated and aligned parallel to the gate bus line 1 because of a horizontal electric field parallel to the gate bus line 1. The rotation of the liquid crystal molecules in turn controls the transmittance through the liquid crystal layer 19.

In this in-plane switching mode liquid crystal display device, since the liquid crystal molecules are switching parallel to the surface of the substrate 10, 11, the viewing-angle dependence problem is solved and contrast ratio is improved.

If the liquid crystal is a negative type (N-type) liquid crystal, with dielectric anisotropy $\Delta\epsilon<0$, the liquid crystal molecules 20 in the liquid crystal layer 19 are aligned perpendicular to the electrodes 5, 6 over the entire liquid crystal layer 19, when no voltage is applied, as shown in FIG. 2A. When voltage is applied, the liquid crystal molecules are rotated and aligned perpendicular to the direction of the field applied between the electrodes 5, 6 because of $\Delta\epsilon<0$. Since the first and second alignment layers 21a, 21b are made of organic materials, such as, for example, indium tin oxide (ITO), having anchoring energy higher than the turning effect of the liquid crystal molecules due to the horizontal electric field, the only rotated liquid crystal molecules are those in the vicinity of the middle plane of the liquid crystal layer 19 and not those in the vicinity of the first and second substrates 10, 11. As a result, the liquid crystal molecules 29 are aligned as shown in FIG. 2B.

FIGS. 3A–3B show an in-plane switching mode liquid crystal display device having a positive type (P-type) liquid crystal and a birefringent anisotropy $\Delta\epsilon<0$. When no voltage is applied, as shown in FIG. 3A, the liquid crystal molecules 20 are aligned approximately parallel to the data and common electrodes 5, 6. When voltage is applied, as shown in FIG. 3B, the liquid crystal molecules are rotated and aligned parallel to the direction of the electric field. At this time, however, only liquid crystal molecules 20 in the vicinity of the middle of the liquid crystal layer 19 are rotated, excluding those molecules near the first and second substrates 10, 11, due to the presence of an organic material-coated layer 21a, 21b.

In the conventional in-plane switching liquid crystal display device described above, the liquid crystal molecules are rotated only in the vicinity of the middle plane of the liquid crystal layer 19, so that light transmittance is controlled using the birefringence of the transmitting material. Thus, insufficient light passes through the liquid crystal layer causing image quality deterioration.

SUMMARY OF THE INVENTION

Accordingly, the present invention is directed to an in-plane switching liquid crystal display that substantially obviates one or more of the problems due to the limitations and disadvantages of the related art.

An object of the present invention is to provide a liquid crystal display device including an inorganic alignment layer having low anchoring energy to improve image quality.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

In one aspect of the present invention, there is provided a liquid crystal display device including: first and second substrates; a liquid crystal layer between the first substrate and the second substrate; a gate bus line and a data bus line crossing each other on the first substrate, the gate bus line and the data bus line defining a pixel region; a thin film transistor at a crossing region of the gate bus line and the data bus line; at least one pair of electrodes in the pixel region, the at least one pair of electrodes applying an electric field parallel to one of the first substrate and second substrate; a first alignment layer over the first substrate and having a first anchoring energy; and a second alignment layer over the second substrate and having a second anchoring energy different from the first anchoring energy of the first alignment layer.

In another aspect of the present invention, there is provided a liquid crystal display device, including: first and second substrates; a liquid crystal layer between the first and second substrates; a plurality of the gate bus line and the data bus line respectively crossing each other on the first substrate, the gate bus line and the data bus line defining a plurality of pixel regions; a plurality of thin film transistors respectively at crossing regions of the gate bus line and the data bus line; at least one pair of electrodes in the pixel region over the first substrate; a first alignment layer over the first substrate, the first alignment layer having a first anchoring energy lower than a turning effect of the liquid crystal layer by the electric field; and a second alignment layer over the second substrate, the second alignment layer having a second anchoring energy higher than the turning effect of the liquid crystal layer by the electric field.

In yet another aspect of the invention, there is provided a liquid crystal display device including: a first substrate having a first alignment layer over the first substrate; a second substrate having a second alignment layer over the second substrate; a liquid crystal layer between the first and second substrate; a gate bus line and a data bus line crossing each other on the first substrate, the gate bus line and the data bus line defining a pixel region; a thin film transistor at a crossing region of the gate bus line and the data bus line; at least one pair of electrodes in the pixel region, the at least one pair of electrodes applying an electric field parallel to one of the first substrate and second substrate; a passivation layer over the first substrate; a shielding layer on the second substrate; and a color filter layer on the shielding layer and the second substrate; wherein the first alignment layer has a first anchoring energy lower than a turning effect of the liquid crystal layer by the electric field; and wherein the second alignment layer has a second anchoring energy higher than the turning effect of the liquid crystal layer by the electric field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

A brief description of description of the invention will first be made.

The liquid crystal display device of the present invention includes first and second substrates, a plurality of gate bus lines and data bus lines crossing each other over the first substrate, a plurality of thin film transistors at the crossing region of the gate bus lines and the data bus lines, a plurality of data and common electrodes parallel to the data bus lines to apply the electric field, a passivation layer over the total area of the first substrate, a first alignment layer including an inorganic layer on the passivation layer, a shielding layer preventing a current leakage through the gate bus line, the data bus line, and the thin film transistor, a color filter layer on the shielding layer and the second substrate, and a second alignment layer including an organic layer on the color filter layer.

The inorganic alignment layer has an anchoring energy lower than that of the organic alignment layer. When no voltage is applied between the pixel electrodes and the common electrodes, the liquid crystal molecules are aligned perpendicular to the data and common electrodes for an N-type liquid crystal. When voltage is applied, only molecules in the vicinity of the first substrate are rotated and aligned parallel to the electrodes to be twisted from the first substrate to the second substrate because the anchoring energy of the first organic alignment layer is higher than the turning effect of the liquid crystal molecules.

Figure 1:
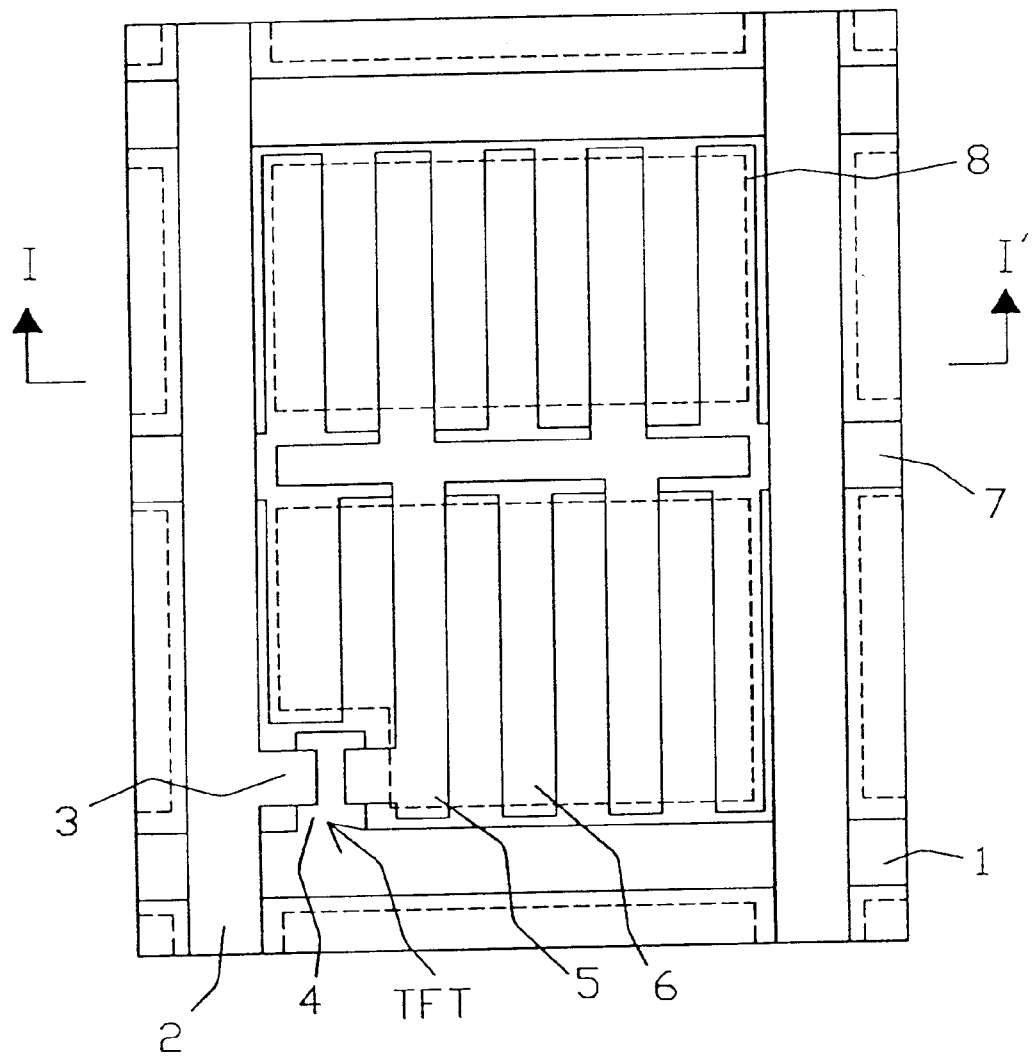
FIG. 1 is a plan view of the conventional in-plane switching mode liquid crystal display device.
Figure 2A:
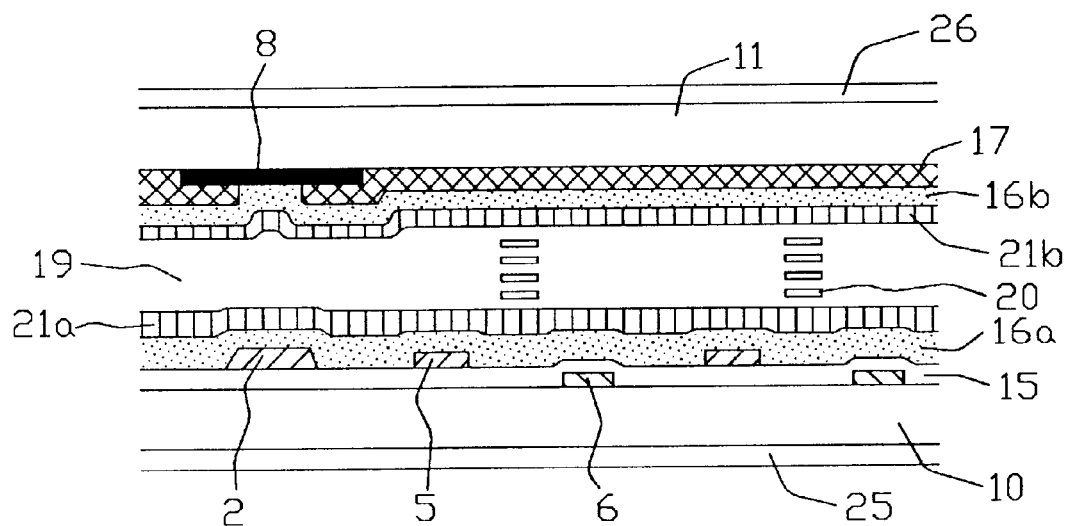
FIGS. 2A–2B are sectional views taken along the line A–A' of FIG. 1.
Figure 2B:
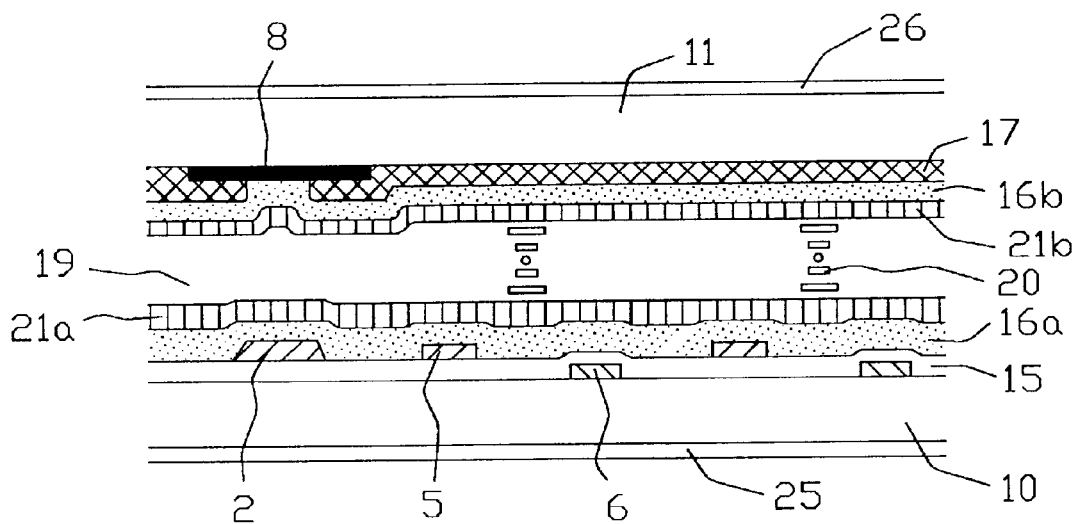
Figure 3A:
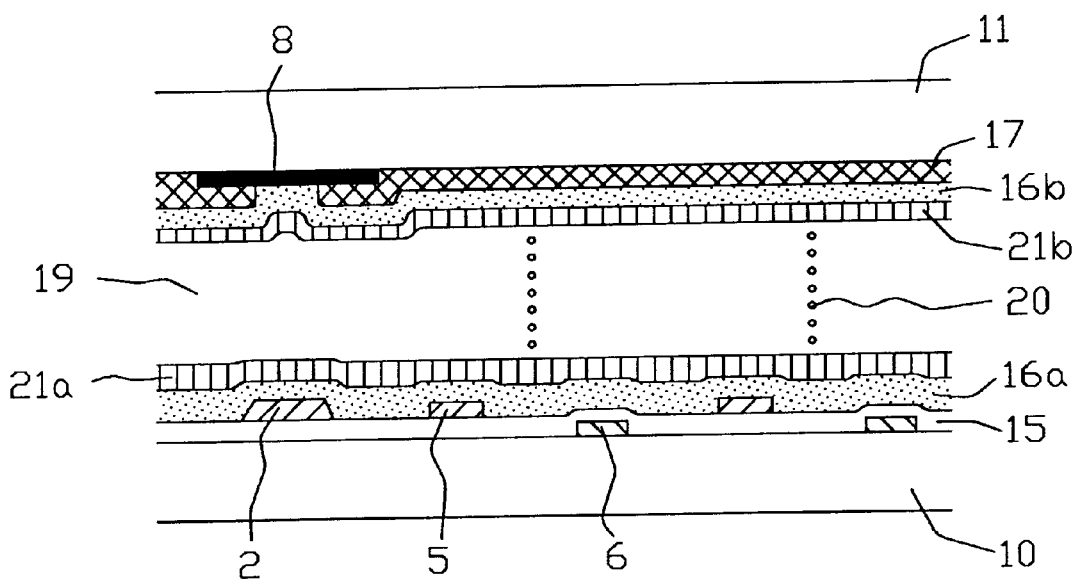
FIGS. 3A–3B are sectional views taken along the line A–A' of FIG. 1.
Figure 3B:
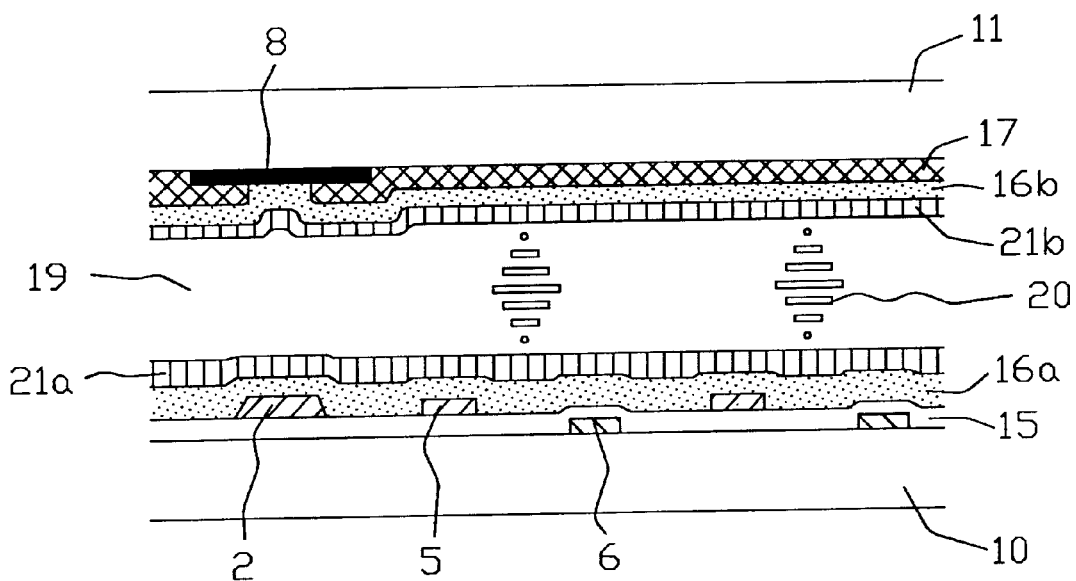
Figure 4A:
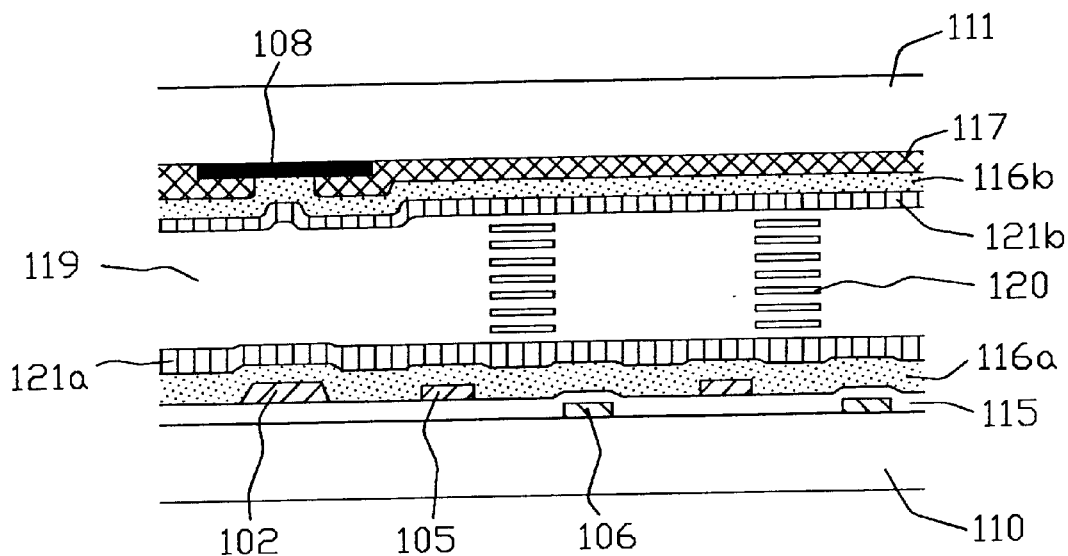
FIGS. 4A–4B are sectional views of the in-plane switching mode liquid crystal display device having negative type liquid crystal according to the present invention.
Figure 4B:
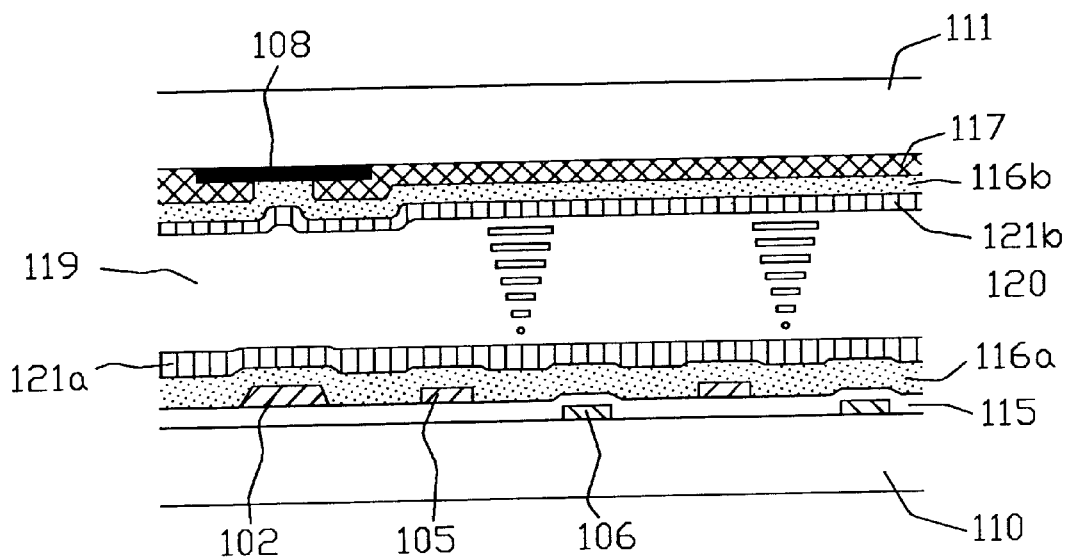

FIGS. 4A—4B is a sectional view of the in-plane switching liquid crystal device according to the present invention. Although only one pixel is represented in this figure, a typical display would include a plurality of pixels.

As shown in FIG. 4A, the common electrodes 106 are formed on the first substrate 110, and the gate insulating layer 115 is deposited thereon. The data bus line 102 and the pixel electrodes 105 are formed on the gate insulating layer 115, and the first passivation layer 116a is deposited thereon. Although not shown in this figure, the gate bus line crossing the data bus line 102 is formed between the first substrate 110 and the gate insulating layer 115, and the thin film transistor is positioned at the crossing region of the data bus line 102 and the gate bus line. The gate electrode and the source/drain electrode of the TFT are connected to the gate bus line and the data bus line 102, respectively. The common electrodes 106 are connected to the common bus line (not shown in this figure) and are extended in the parallel direction of the gate bus line. The data bus line 102, the pixel electrodes 105, and the common electrodes 106 are arranged at regular intervals.

The gate bus line, the common bus line, and the common electrodes are formed by etching a sputtered metal thin film, including AlTa film. The gate insulating layer 115, (including, e.g., $SiO_x$ and $SiN_x$), and the semiconductor layer (including amorphous silicon) of the thin film transistor are formed by a plasma chemical vapor deposition process and a photo-etching process. At that time, the gate insulating layer 115 and the semiconductor layer are successively deposited by a single process.

The data bus line 102, the source/drain electrodes of the thin film transistor, and the pixel electrode 105 are formed by sputtering and patterning a metal layer, such as a Cr layer.

The first passivation layer 116a is deposited over the entire area of the first substrate 110 by a plasma chemical vapor deposition process. On the first passivation layer 116a, an inorganic material (for example, EXP-OA002, produced by NISSAN CHEMICAL) is coated to achieve a thickness of about 900 Å and then baked at a temperature of about 210° C. to form the first alignment layer 121a. This inorganic alignment layer 121a has a low anchoring energy.

A shielding layer 108 is formed over the second substrate 111 to prevent a current leakage through the gate bus line, the data bus line 102, the common bus line, and the thin film transistor. This shielding layer 108 is formed by depositing and patterning a metal such as $Cr/CrO_x$. The color filter layer 117 is deposited on the shielding layer 108 and the substrate 111, and the second passivation layer 116b is deposited thereon.

On the second passivation layer 116b, a polyimide (such as RN 7492, which is an organic alignment material produced by NISSAN CHEMICAL), is deposited onto the substrate to a thickness of about 900 Å. The deposition takes place at a temperature of 210° C. to form the second alignment layer 121b. The first and second alignment layers 121a, 121b are twice rubbed by a rubbing cloth having a turning speed of about 500 rpm, the moving speed of 10 mm/sec, and a pressing amount of 0.4 mm to form the alignment direction on the surface of the alignment layers 121a, 121b parallel to each other.

The N-type liquid crystal, having $\Delta\epsilon<0$, is inserted between the first and second substrates 110, 111.

When no voltage is applied between the pixel electrodes 105 and the common electrodes 106 in the liquid crystal display device of the present invention, the liquid crystal molecules 120 are aligned along the alignment directions of the first and second alignment layers 121a, 121b, as shown in FIG. 4A. That is, all of the liquid crystal molecules 120 in the liquid crystal layer 119 are aligned perpendicular to the electrodes 105, 106. When a voltage is applied, an electric field is generated between the data (or pixel) electrode 105 and the common electrode 106. This electric field is strongest at the surface of the first substrate 110 and weakest at the surface of the second substrate 111. In other words, the field in the liquid crystal layer 119 becomes weaker from the first substrate 110 to the second substrate 111. This means that the liquid crystal molecules are most subject to restraint by the electric field in the vicinity of the first substrate 110.

Further, the inorganic alignment layer 121a over the first substrate 110 has an anchoring energy lower than the turning effect of the liquid crystal molecules 120 caused by the electric field, so that the liquid crystal molecules 120 in the vicinity of the first substrate 110 are rotated and then aligned parallel to the electrodes 105, 106. Since the organic alignment layer 121b over the second substrate 111 has an anchoring energy higher than the turning effect of the liquid crystal molecules 120, the liquid crystal molecules 120 in the vicinity of the second substrate 111 are not subject to restraint by the electric field. As a result, the liquid crystal molecules 120 are aligned perpendicular to the electrodes 105, 106 along the alignment direction of the alignment layer 121b. Accordingly, the liquid crystal molecules 120 are twisted about 90° from the first substrate 110 to the second substrate 111.

The liquid crystal display device of the present invention has a greater brightness than a conventional liquid crystal device in which only the liquid crystal molecules in the vicinity of the it middle plane of the liquid crystal layer rotate.

Figure 5A:
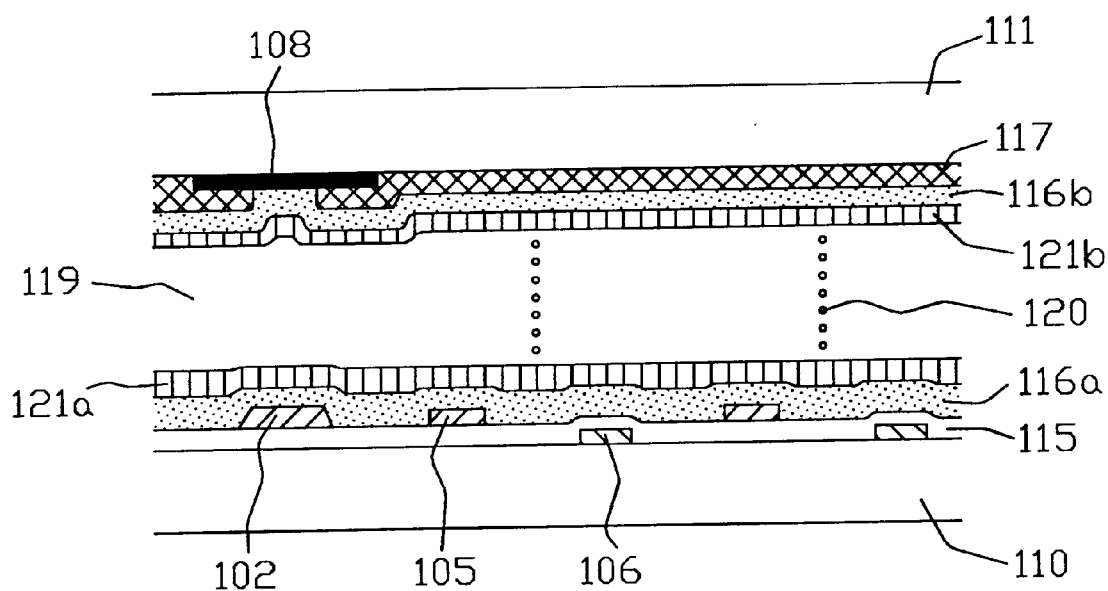
FIGS. 5A–5B are sectional views of the in-plane switching mode liquid crystal display device having positive type liquid crystal according to the present invention.
Figure 5B:
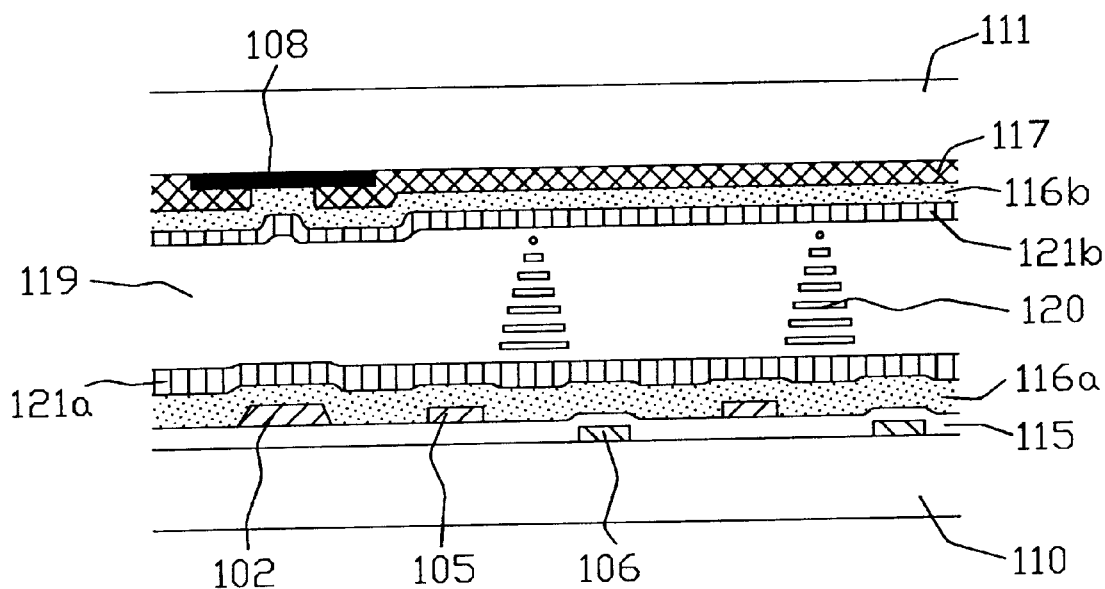

FIGS. 5A–5B show a P-type liquid crystal-injected device. This structure is similar to the structure in FIGS. 4A–4B except for the type of liquid crystal. When no voltage is applied between the data (or pixel) electrodes 105 and the common electrodes 106, as shown in FIG. 5A, the liquid crystal molecules 120 in the liquid crystal layer 119 are aligned parallel to the electrodes 105, 106. When voltage is applied, as shown in FIG. 5B, only those molecules 120 in the vicinity of the first substrate 110 are rotated and aligned perpendicular of the electrodes 105, 106, so that the liquid crystal molecules 120 are twisted about 90° from the first substrate 110 to the second substrate 111.

In the present invention, since the first alignment layer is an inorganic layer having anchoring energy lower than that of the second alignment layer, only liquid crystal molecules in the vicinity of the first substrate are affected by the electric field, and are twisted from the first substrate to the second substrate. Thus, the amount of light passing through the liquid crystal layer increases and resultant brightness improves.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A liquid crystal display device comprising:

first and second substrates;

a liquid crystal layer between the first substrate and the second substrate;

a gate bus line and a data bus line crossing each other on the first substrate, the gate bus line and the data bus line defining a pixel region;

a thin film transistor at a crossing region of the gate bus line and the data bus line;

at least one pair of electrodes in the pixel region, the at least one pair of electrodes applying an electric field parallel to one of the first substrate and second substrate;

a first alignment layer over the first substrate and having a first anchoring energy; and a second alignment layer over the second substrate and having a second anchoring energy different from the first anchoring energy of the first alignment layer.

2. The liquid crystal display device according to claim 1, wherein the first alignment layer and the second alignment layer include an inorganic layer and an organic layer respectively.

3. The liquid crystal display device according to claim 1, wherein the first anchoring energy of the first alignment layer is lower than the second anchoring energy of the second alignment layer.

4. The liquid crystal display device according to claim 1, wherein alignment directions of the first and second alignment layers are substantially parallel to each other.

5. The liquid crystal display device according to claim 4, wherein the alignment directions of the first and second alignment layers correspond to a rubbing process.

6. The liquid crystal display device according to claim 1, further comprising:

a passivation layer over the first substrate;

a shielding layer on the second substrate; and a color filter layer on the shielding layer and the second substrate.

7. The liquid crystal display device according to claim 1, wherein the liquid crystal layer includes a negative-type layer.

8. The liquid crystal display device according to claim 1, wherein the liquid crystal layer includes a positive-type layer.

9. A liquid crystal display device, comprising:

first and second substrates;

a liquid crystal layer between the first and second substrates;

a plurality of the gate bus line and the data bus line respectively crossing each other on the first substrate, the gate bus line and the data bus line defining a plurality of pixel regions;

a plurality of thin film transistors respectively at crossing regions of the gate bus line and the data bus line;

at least one pair of electrodes in the pixel region over the first substrate;

a first alignment layer over the first substrate, the first alignment layer having a first anchoring energy lower than a turning effect of the liquid crystal layer by the electric field; and a second alignment layer over the second substrate, the second alignment layer having a second anchoring energy higher than the turning effect of the liquid crystal layer by the electric field.

10. The liquid crystal display device according to claim 9, wherein the first alignment layer includes inorganic layer.

11. The liquid crystal display device according to claim 9, wherein the second alignment layer includes organic layer.

12. The liquid crystal display device according to claim 11, wherein the organic layer includes polyimide.

13. The liquid crystal display device according to claim 8, wherein the first anchoring energy of the first alignment layer is lower than the second anchoring energy of the second alignment layer.

14. The liquid crystal display device according to claim 9, wherein alignment directions of the first and second alignment layers are substantially parallel to each other.

15. The liquid crystal display device according to claim 9, wherein alignment directions of the first and second alignment layers correspond to a rubbing process.

16. The liquid crystal display device according to claim 9, further comprising:

a passivation layer over the first substrate;

a shielding layer on the second substrate; and a color filter layer on the shielding layer and the second substrate.

17. The liquid crystal display device according to claim 9, wherein the liquid crystal layer includes a negative-type layer.

18. The liquid crystal display device according to claim 9, wherein the liquid crystal layer includes a positive-type layer.

19. A liquid crystal display device comprising:

a first substrate having a first alignment layer over the first substrate;

a second substrate having a second alignment layer over the second substrate;

a liquid crystal layer between the first and second substrate;

a gate bus line and a data bus line crossing each other on the first substrate, the gate bus line and the data bus line defining a pixel region;

a thin film transistor at a crossing region of the gate bus line and the data bus line;

at least one pair of electrodes in the pixel region, the at least one pair of electrodes applying an electric field parallel to one of the first substrate and second substrate;

a passivation layer over the first substrate;

a shielding layer on the second substrate; and a color filter layer on the shielding layer and the second substrate;

wherein the first alignment layer has a first anchoring energy lower than a turning effect of the liquid crystal layer by the electric field; and wherein the second alignment layer has a second anchoring energy higher than the turning effect of the liquid crystal layer by the electric field.

20. The liquid crystal display device according to claim 19, wherein the liquid crystal layer includes a negative-type layer.

21. The liquid crystal display device according to claim 19, wherein the liquid crystal layer includes a positive-type layer.

* * * * *